(12) United States Patent
Marra et al.

(10) Patent No.: US 10,234,678 B1
(45) Date of Patent: Mar. 19, 2019

(54) FLUID DISPENSING METHOD FOR ELECTROWETTING ELEMENT MANUFACTURE

(71) Applicant: Amazon Technologies, Inc., Seattle, WA (US)

(72) Inventors: Lucia Marra, Eindhoven (NL); Cindy Everaars-Nieuwkerk, Grashoek (NL); Romaric Mathieu Massard, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 9 days.

(21) Appl. No.: 15/139,056

(22) Filed: Apr. 26, 2016

(51) Int. Cl.
| | | |
|---|---|---|
| G02B 26/00 | (2006.01) | |
| B05D 3/00 | (2006.01) | |
| B05C 5/02 | (2006.01) | |
| B05C 11/10 | (2006.01) | |
| B05C 21/00 | (2006.01) | |
| B05D 1/26 | (2006.01) | |
| B05D 3/04 | (2006.01) | |

(52) U.S. Cl.
CPC .......... *G02B 26/005* (2013.01); *B05C 5/0254* (2013.01); *B05C 11/1005* (2013.01); *B05C 21/00* (2013.01); *B05D 1/26* (2013.01); *B05D 3/007* (2013.01); *B05D 3/0466* (2013.01); *B05D 3/0493* (2013.01)

(58) Field of Classification Search
CPC .......... B05C 5/00; B05C 11/00; B05C 21/00; B05D 1/00; B05D 3/00; G02B 26/00; B01F 17/00
See application file for complete search history.

(56) References Cited

U.S. PATENT DOCUMENTS

| | | | | |
|---|---|---|---|---|
| 5,868,844 | A * | 2/1999 | Kato | A44B 18/0073 118/642 |
| 6,409,332 | B1 * | 6/2002 | Yraceburu | B41J 11/007 271/197 |
| 2001/0054363 | A1 * | 12/2001 | Nakazawa | B41C 1/1066 101/465 |
| 2004/0040504 | A1 * | 3/2004 | Yamazaki | C23C 14/042 118/715 |
| 2007/0105494 | A1 * | 5/2007 | Lin | B08B 15/023 454/299 |
| 2011/0143018 | A1 * | 6/2011 | Peng | H01M 4/0419 427/9 |
| 2013/0010348 | A1 * | 1/2013 | Massard | G02B 26/005 359/290 |
| 2013/0296192 | A1 * | 11/2013 | Jacobson | B01J 19/0046 506/11 |
| 2014/0141155 | A1 * | 5/2014 | Jin | H05K 3/1258 427/98.4 |
| 2014/0211292 | A1 * | 7/2014 | Schram | G02B 26/005 359/290 |
| 2014/0226200 | A1 * | 8/2014 | Nomura | G02B 26/005 359/290 |

\* cited by examiner

*Primary Examiner* — David P Turocy
*Assistant Examiner* — Mohammad Mayy
(74) *Attorney, Agent, or Firm* — EIP US LLP

(57) ABSTRACT

A method of dispensing fluids for manufacturing an electrowetting element. The method comprises: dispensing a first layer of a first fluid on a support plate surface; letting a first portion of the first fluid vaporize as a vapor from the first layer into a region over the first layer; removing the vapor from the region over the first layer; and dispensing on the first layer a second layer of a second fluid, the second fluid immiscible with the first fluid.

20 Claims, 3 Drawing Sheets

FLUID DISPENSING METHOD FOR ELECTROWETTING ELEMENT MANUFACTURE

BACKGROUND

During manufacture of an electrowetting element, at least one fluid layer is dispensed.

It is desirable to improve control of a fluid layer thickness for the electrowetting element.

DETAILED DESCRIPTION

In examples described below, a method of dispensing at least one fluid is described. At least part of the fluid is vaporisable and after dispensing a layer of such a fluid tends to at least partly vaporise into a region over the dispensed layer. The vapour resulting from the vaporisation is removed, for example by suction. By this vaporisation and vapour removal, a thickness of the fluid layer decreases. A second fluid layer may then be dispensed on the previously dispensed layer with the decreased thickness. The decreased thickness of the fluid layer may be less than a wall height. Further, the new methods are more suitable and safer for industrial applications, compared with other options for reducing a fluid layer thickness below a wall height. In such examples a wall height having a hydrophilic surface can assist the vaporisation as an oil based liquid for example will tend to adhere less preferentially on a hydrophilic wall surface than a hydrophobic wall surface.

Before describing examples of the method in detail, an example of an electrowetting element will first be given with reference to FIGS. 1 and 2, followed by an example of apparatus for manufacturing part of an electrowetting element.

Figure 1:
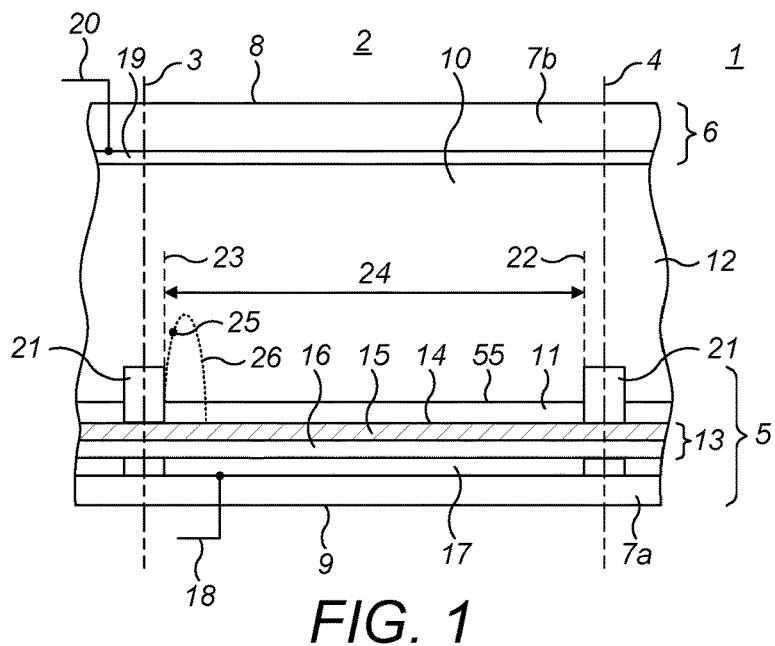
FIG. 1 shows schematically a cross-section of an example electrowetting element.

FIG. 1 shows a diagrammatic cross-section of part of an example of an electrowetting display device 1, including a plurality of picture elements or display elements 2, one of which is shown in the Figure and which may also in some examples be considered to be an electrowetting pixel. Such a pixel or display element is an example of an electrowetting cell or an electrowetting element, the pixel or display element being an example of an electrowetting element for providing a display effect. The lateral extent of the display element is indicated in the Figure by two dashed lines 3, 4. The display elements comprise a first support plate 5 and a second support plate 6. The support plates may be separate parts of each display element, but the support plates may be shared in common by the plurality of display elements. The support plates may include a glass or polymer substrate 7a, 7b and may be rigid or flexible. The support plates in some examples include further layers and/or structures than illustrated, for example circuitry for controlling the display elements. Such features are not illustrated, for clarity.

The display device has a viewing side 8 on which an image or display formed by the display device can be viewed and a rear side 9. In the Figure a surface of the first support plate 5, which surface is in this example a surface of the substrate 7a, is the rear side 9; a surface of the second support plate 6, which surface is in this example a surface of the substrate 7b, is the viewing side 8; alternatively, in other examples, a surface of the first support plate may be the viewing side. The display device may be of the reflective, transmissive or transflective type. The display device may be an active matrix driven or a direct drive display device as the skilled person will understand. The plurality of display elements may be monochrome. For a colour display device the display elements may be divided in groups, each group having a different colour; alternatively, an individual display element may be able to show different colours.

A space 10 of each display element between the support plates is filled with two fluids, for example liquids. In the example of FIG. 1, the space 10 is filled with a first layer of a first fluid, for example a first liquid 11 and a second layer of a second fluid, for example a second liquid 12. As will become clearer below, the layer of the first liquid in examples corresponds with a second portion of a dispensed fluid layer which remains after vaporisation.

The liquid of the second layer is immiscible with the liquid of the first layer. Therefore, the first layer and the second layer do not substantially mix with each other and in some examples do not mix with each other to any degree. With the first and second layers substantially not mixing with each other, it is envisaged in some examples that there may be some degree of mixing of the first and second layers, but that this is considered negligible in that the majority of the volume of first layer is not mixed with the majority of the volume of the second layer. The substantial immiscibility of the first and second layers is due to the properties of the first and second layers, for example their chemical compositions; the first and second layers tend to remain separated from each other, therefore tending not to mix together to form a homogeneous mixture. Due to this immiscibility, the liquids of the first and second layers meet each other at an interface labelled 55 in FIG. 1 for when no voltage is applied and labelled 57 for when a voltage is applied, which interface determines a boundary between the volume of the liquid of the first layer and the volume of the liquid of the second layer; this interface or boundary may be referred to as a meniscus. The location and shape of the interface between the first layer and the second layer in examples is determined by the applied voltage. The thickness of the first and second layers in FIG. 1 is shown as an example; in other examples, the first and/or second layers may have different thicknesses.

The liquid of the second layer of the device is at least one of electrically conductive or polar, for example the liquid of the second layer is electrically conductive, polar, or both, and may be water, or a salt solution such as a solution of potassium chloride in water. The liquid of the second layer may be transparent; it may instead be coloured, for example, or absorbing. The liquid of the first layer of the device, which is electrically non-conductive, may for example include an alkane like decane or hexadecane, silicone oil or decalin (otherwise known as bicyclo-4,4,0-decane). Further details of such liquids will be described later.

The liquid of the first layer may absorb at least a part of the visible spectrum. The liquid of the first layer may be transmissive for a part of the visible spectrum, forming a colour filter. For this purpose the liquid of the first layer may be coloured by addition of pigment particles or a dye. Alternatively, the liquid of the first layer may be black, for example absorb substantially all parts of the visible spectrum, or reflecting. A reflective liquid may reflect the entire visible spectrum, making the layer appear white, or part of it, making it have a colour. In examples described herein, the liquid of the first layer is black and therefore absorbs substantially all parts of the optical spectrum, for example in the visible light spectrum. Typically, substantially absorbs for example includes a degree of variation, therefore the liquid of the first layer may not absorb all wavelengths, but the majority of wavelengths within a given spectrum such as the visible spectrum, so as to perform the function of the first layer in the element. The liquid of the first layer may therefore be configured to absorb substantially all light incident on the first layer. For example the liquid of the first layer may absorb 90% or more of light in the visible spectrum and incident on the first layer.

The support plate 5 includes a layer with a surface for adjoinment by a liquid such as the liquid of the first layer described herein. Such a surface is also referred to herein as a support plate surface 14. In examples described herein, the layer is an insulating layer 13. The insulating layer may be transparent, for example fully transparent, for example transmissive. The insulating layer 13 may extend between walls of a display element. To avoid short circuits between the second layer of liquid 12 and electrodes arranged under the insulating layer, layers of the insulating layer may extend uninterrupted over a plurality of display elements 2, as shown in the Figure. The insulating layer has the surface 14 facing, for example closest to, the space 10 of the display element 2. The thickness of the insulating layer may be less than 2 micrometers and may be less than 1 micrometer.

The insulating layer in examples described herein is for example formed of a layer 15 which is for example formed of a hydrophobic material such as Teflon AF1600® and a barrier layer 16 with predetermined dielectric properties, the layer 15 facing, for example being closer to, the space 10, as shown in the Figure. The barrier layer 16 may have a thickness, taken in a direction perpendicular to the plane of the substrate, between 50 nanometers and 500 nanometers and may be made of an inorganic material like silicon oxide or silicon nitride.

In the absence of an applied voltage, for example with the applied voltage being a zero voltage, the liquid of the first layer 11 adheres preferentially to the surface of the insulating layer 13 for adjoinment by the first layer, since the surface for adjoinment by the first layer has a higher, for example greater, wettability for the liquid of the first layer than for the liquid of the second layer; the surface may therefore be hydrophobic. As will be explained, with the applied voltage being a non-zero voltage, the surface has a higher wettability for the liquid of the second layer than for the liquid of the first layer; for example the surface with the applied non-zero voltage may be considered to be hydrophilic. Wettability relates to the relative affinity of a liquid for the surface of a solid. Wettability may be measured by the contact angle between a boundary of the liquid and the surface of the solid. The contact angle is determined by the difference in surface tension between the liquid and the solid at the liquid-solid boundary. For example, a high difference in surface tension can indicate hydrophobic properties. As the skilled person will appreciate, a material may be considered to be hydrophobic if the contact angle with water is greater than 90 degrees; a material may therefore be considered to be hydrophilic if the contact angle with water is less than 90 degrees.

Each display element 2 includes a first electrode 17 as part of the support plate 5. In examples shown there is one such electrode 17 per element; in other examples there may be more than one electrode per display element. The electrode 17 is electrically insulated from the first and second layers by the insulating layer 13; electrodes of neighbouring display elements are separated by a nonconducting layer. In some examples, further layers may be arranged between the insulating layer 13 and the electrode 17. The electrode 17 can be of any desired shape or form. The electrode 17 of a display element is supplied with voltage signals by a signal line 18, schematically indicated in the Figure.

The support plate 6 for example includes a second electrode 19, which may extend between walls of a display element, or be located above or covering the walls of the display element or extend uninterruptedly over a plurality of display elements 2, as shown in the Figure. The electrode 19 is in electrical contact with the liquid of the second layer 12 and is common to all display elements. The electrodes 17 and 19 may be made of for example the transparent conductive material indium tin oxide (ITO). A second signal line 20 is connected to the electrode 19. Alternatively, the electrode may be arranged at a border of the support plates, where it is in electrical contact with the liquid of the second layer. This electrode may be common to all elements, when they are liquidly interconnected by and share the liquid of the second layer, uninterrupted by walls. The display element 2 can be controlled by a voltage V applied between the signal lines 18 and 20. The signal line 18 can be coupled to a matrix of control lines on the substrate 7a. The signal line 18 and 20 are coupled to a display driving system.

The liquid of the first layer 11 in this example is confined to a display element by at least one wall, in this example walls 21, that follow the cross-section of the display element. Such walls may be considered to surround the support plate surface 14 of an electrowetting element, by for example bounding a perimeter of the support plate surface 14. The cross-section of a display element may have any shape; when the display elements are arranged in a matrix form, the cross-section is usually square or rectangular. Although the walls are shown as structures protruding from the insulating layer 13 and formed on a surface of the insulating layer 13, they may instead be a surface layer of the support plate that repels the liquid of the first layer, such as a hydrophilic or less hydrophobic layer. The walls may extend from the first to the second support plate but may instead extend partly from the first support plate to the second support plate as shown in FIG. 1.

The extent of the display element, indicated by the dashed lines 3 and 4, corresponds to the centre of the walls 21. The area of the surface between the walls of a display element, indicated by the dashed lines 22 and 23, is called the display area 24, over which a display effect occurs. The area of the surface on which the walls are formed may be referred to as the wall area. An extent of the surface 14 corresponding to the extent of the display area is in this example hydrophobic. The display effect depends on an extent that the liquids of the first and second layers adjoin the surface determined by the display area, in dependence on the magnitude of the applied voltage V described above. The magnitude of the applied voltage V therefore determines the configuration of the liquids of the first and second layers within the electrowetting element. In other words, the display effect depends on the configuration of the liquids of the first and second layers in the display element, which configuration depends on the magnitude of the voltage applied to the electrodes of the display element. The display effect gives rise to a display state of the display element for an observer looking at the display device. When switching the electrowetting element from one liquid configuration to a different liquid configuration the extent of the liquid of the second layer adjoining the display area surface may increase or decrease, with the extent of the liquid of the first layer adjoining the display area surface decreasing or increasing, respectively.

Figure 2:
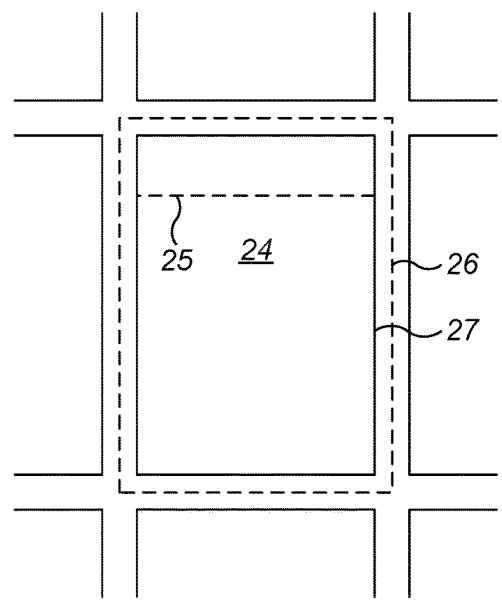
FIG. 2 shows schematically a plan view of the electrowetting element of FIG. 1.

FIG. 2 shows a matrix of rectangular picture elements in a plan view of the hydrophobic surface of the first support plate. The extent of the central picture element in FIG. 2, corresponding to the dashed lines 3 and 4 in FIG. 1, is indicated by the dashed line 26. Line 27 indicates the inner border of a wall; the line 27 is also the edge of the display area 24.

When a zero or substantially zero voltage is applied between the electrodes 17 and 19, for example when the electrowetting element is in an off state, the liquid of the first layer 11 forms a layer between the walls 21, as shown in FIG. 1. Application of a voltage will retract the liquid of the first layer, for example against a wall as shown by the dashed shape 25 in FIG. 1 or FIG. 2. The controllable shape of the liquid of the first layer, in dependence on the magnitude of applied voltage, is used to operate the picture element as a light valve, providing a display effect over the display area 24. For example, switching the liquids of the first and second layers to increase adjoinment of the liquid of the second layer with the display area may increase the brightness of the display effect provided by the element. This display effect determines the display state an observer will see when looking towards the viewing side of the display device. The display state can be from black to white with any intermediate grey state; in a colour display device, the display state may also include colour.

Figure 3:
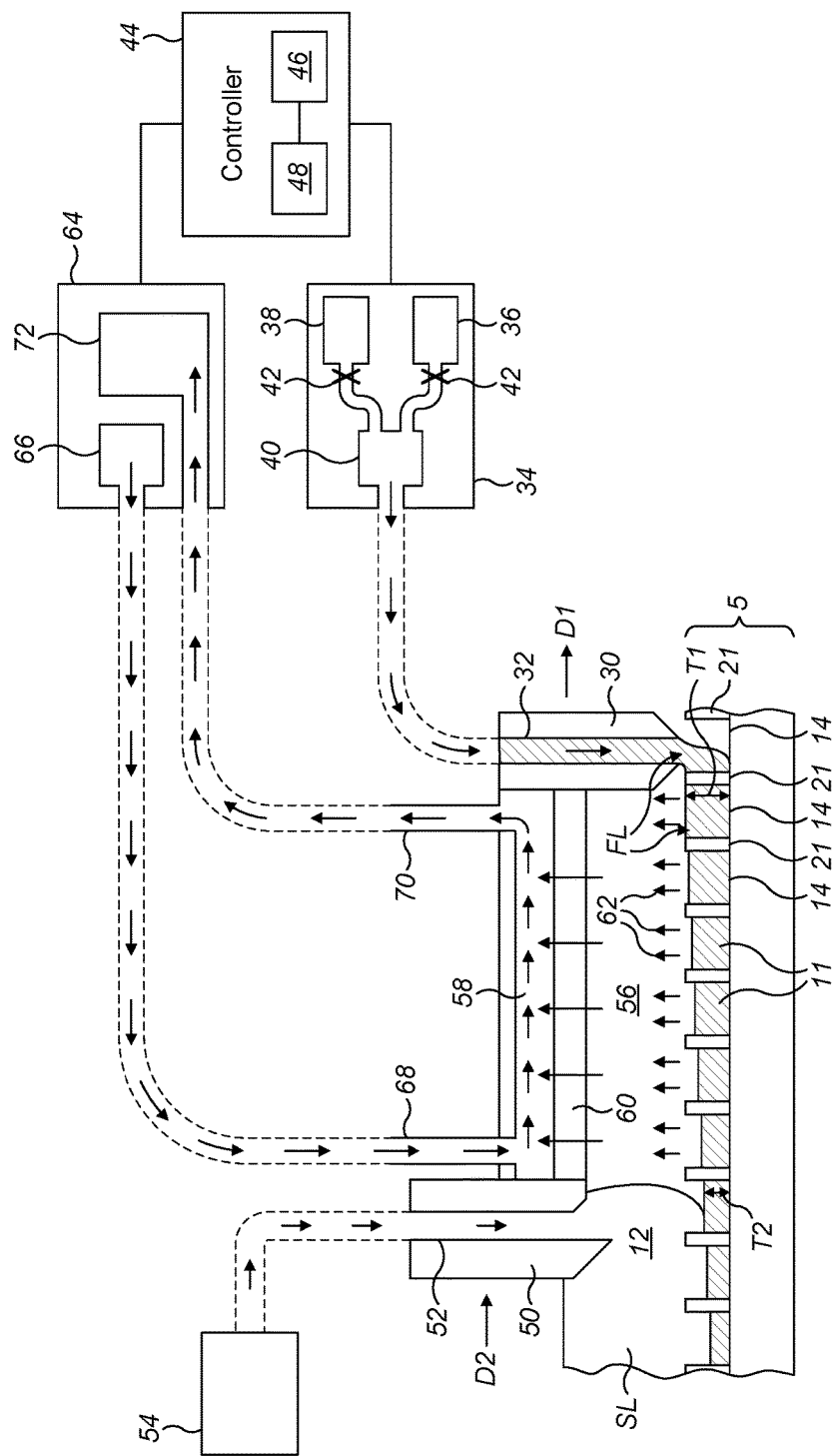
FIG. 3 shows schematically in cross-section apparatus for dispensing fluids as part of a method of manufacturing an electrowetting element, according to examples.
Figure 4:
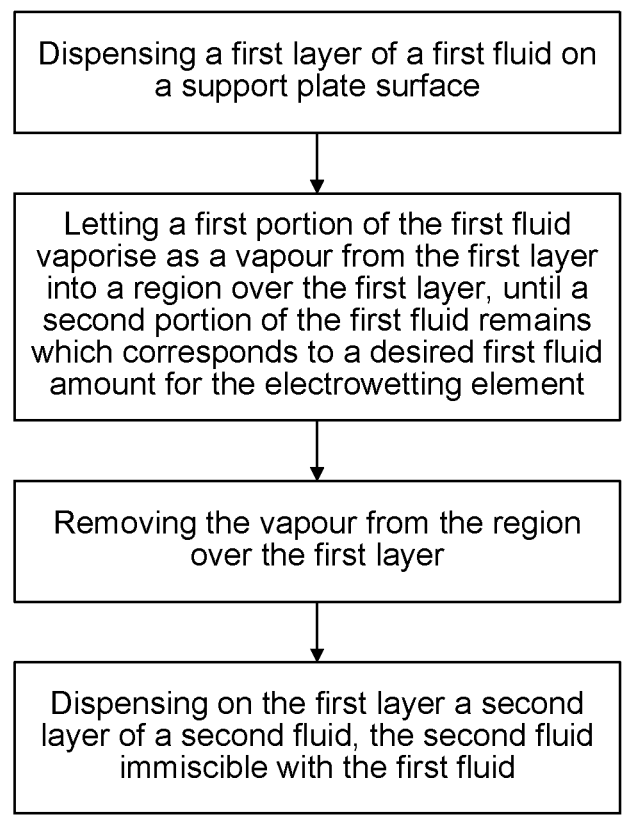
FIG. 4 is a flow diagram of part of a method of manufacturing an electrowetting element, according to examples.

Referring now to FIGS. 3 and 4, apparatus for and a method of dispensing fluids as part of a method of manufacturing an electrowetting element are described, in accordance with examples. In describing such examples, features of the electrowetting element described above using FIGS. 1 and 2 will be referred to; the same reference numerals are used and corresponding descriptions should be taken to apply. It is to be appreciated that in further examples the apparatus and method may be used to manufacture an electrowetting element with similar features as described in the context of the method and apparatus, but which may also have different features from the electrowetting element examples described earlier.

Referring to FIG. 3, the apparatus will be described and with reference to FIGS. 3 and 4, the method of fluid dispensing will be described.

A first dispenser 30 is configured for dispensing a first layer of a first fluid. The dispensed first fluid (illustrated with shading in FIG. 3) is for example the first liquid 11. In some examples at least one further fluid, for example a third fluid is also comprised by the dispensed first fluid; hence in examples the dispensed first fluid may be a mixture of fluids. Further details are described further below. The first dispenser is for example an elongate dispenser having a conduit 32, tube, channel or other pathway through which the first fluid being dispensed can flow. The conduit is elongate in a direction perpendicular the plane of the cross-section of FIG. 3, and may therefore be considered a slit or slot. The conduit may extend to dispense the first fluid of a plurality of electrowetting elements extending along a row or column of electrowetting elements of a matrix of electrowetting elements. The first dispenser of FIG. 3 is for example used for a slit filling technique of dispensing the first layer of the first fluid, which the skilled person will be familiar with. In such a slit filling technique, a layer of the first fluid is dispensed, for example like a curtain of fluid, onto the support plate surface of each electrowetting element. Various pumps and other control mechanisms may be used to control the dispensing, as will be appreciated.

In some examples such as that of FIG. 3, the conduit of the first dispenser is fluidly connected (in this example via a conduit indicated with dashed lines) to a fluid mixing system 34 for mixing the first fluid to be dispensed. In the example shown, a first fluid reservoir 36 and a third fluid reservoir 38 respectively hold volumes of the first fluid and the third fluid, which are fed to a mixer 40. The flow of fluid from each reservoir is controllable with valves 42.

The fluid mixing system 34 is connected to a controller 44 which for example comprises at least one processor 46 connected to at least one memory 48. The at least one memory comprises computer program instructions, for example computer software, and the at least one memory and the computer program instructions are configured to, with the at least one processor, control the mixing system, for example to control a volume of the first fluid and a volume of the third fluid which are mixed together. More details will be described later.

A second dispenser 50 is configured for dispensing a layer of the second fluid, such as the second liquid 12 described earlier. The second dispenser in some examples such as that of FIG. 3 is similar to the first dispenser, and therefore comprises an elongate conduit 52 such as a slit or slot which is for dispensing a second layer of the second liquid using a slit or slot filling technique. The conduit of the second dispenser is fluidly connected (again in this example via a conduit indicated with dashed lines) to a second fluid reservoir 54 from which the second fluid is fed to be dispensed.

The apparatus further comprises a vapour removal system configured to remove vapour from a region over the first layer. Features of the vapour removal system will now be described together with a method of fluid dispensing according to examples.

The first dispenser dispenses a first layer of the first fluid on a support plate surface, in this example the surface 14 described previously of a first support plate 5. The support plate has walls, such as those labelled 21 and described previously. At least one of the support plate surface and the first dispenser is moved relative to the other of the at least one of the support plate surface and the first dispenser. This may be done with appropriate actuation of the first dispenser (and in examples also the second dispenser and chamber described below) and/or of a frame or platform on which is mounted the support plate. Assembly of the support plate is not described herein, but appropriate manufacturing techniques will be apparent to the skilled person.

In this example, the first dispenser is moved over the support plate surface in the direction D1 indicated in FIG. 3. The first dispenser dispenses the first fluid. The dispensed first fluid is dispensed towards the support plate surface and is dispensed as a first layer FL of the first fluid on the support plate surface. In examples such as those of FIG. 3, the first layer FL has a first thickness T1 substantially equal to a wall height of at least one of the walls 21 of the support plate (otherwise referred to as support plate walls), which surround the support plate surface of at least one electrowetting element being manufactured. Thicknesses of the first layer and the wall height are each taken in the same direction, perpendicular a plane of the support plate surface. With the first thickness being substantially equal to the wall height, the first thickness is equal to the wall height within acceptable measuring and fluid dispensing tolerances.

To dispense the first fluid as the first layer with the first thickness, any of the following parameters may be controlled: a rate of dispensing the first fluid from the first dispenser; a distance of the first dispenser from the support plate surface; and a speed of moving the first dispenser over the support plate surface.

As illustrated in FIG. 1, and desired in other examples of electrowetting element, a thickness of a layer of the first fluid is less than a wall height. However, achieving this is not straightforward, as it is often simpler to dispense the first fluid with a substantially equal thickness as the wall height. This may be due to the difficulty of inserting a fluid dispenser between walls. If alternatively, a first fluid dispenser is moved over the walls but dispenses a layer of the first fluid with a smaller thickness than the wall height, this can cause irregular first fluid layer thicknesses between different electrowetting elements.

Referring now to FIGS. 3 and 4, the first dispenser dispenses the first fluid as the first layer. As can be seen from FIG. 3, the first dispenser and the second dispenser are spaced from each other for example in a direction parallel the plane of the support plate surface. The second dispenser dispenses the second fluid as a second layer SL on the first layer FL, for example the second dispenser being moved in a similar manner as the first dispenser, in this example in the direction D2. With the first and second dispensers being spaced from each other, there is a region 56 over the first layer FL, which is in this example between the first dispenser and the second fluid being dispensed by the second dispenser. The region is typically a cavity, space or void which is present over the first layer dispensed by the first dispenser before the second layer has been dispensed on the first layer. Thus, as the second layer is dispensed, the position of the region 56 moves as the first layer is dispensed further across the support plate 5 and the second layer is dispensed on the first layer thereafter. Like the first and second dispensers, the region may be elongate in shape too, for example in a direction perpendicular the plane of the cross section of FIG. 3.

A vapour removal system comprises in examples such as FIG. 3 a chamber 58. The chamber is located over the region 56 and is in these examples located between the first dispenser and the second dispenser. The chamber is for example an enclosure, container or cavity for holding vapour of the first portion of the first fluid from the first layer. With the region 56 being over the first layer and the chamber being over the region, the region and the chamber are covering or overlapping, and not necessarily above, the first layer and the region respectively. In examples such as those of FIG. 3, the chamber is elongate in a direction perpendicular the plane of the cross-section of FIG. 3.

A side of the chamber nearest the support plate may be open, for example without a side wall, and may therefore open into the region 56; whereas in other examples such as that of FIG. 3, the chamber may comprise a barrier 60 at the side of the chamber nearest the support plate. The barrier is in some examples a vapour permeable barrier, for example a vapour permeable membrane, or in other examples a layer of microspheres or microbeads between which vapour may pass. The membrane may for example have a thickness of 10 to 1000 micrometers.

A furthest side of the chamber furthest from the support plate may be sealed or closed by a chamber wall for example, which extends between a side of the first dispenser and a side of the second dispenser. Such a side may in some examples have a gas outlet and in some examples a gas inlet therethrough.

In some examples, the furthest side and the barrier are each mounted between sides of the first and second dispensers, thus forming an integral apparatus for dispensing the first and second fluids. Such apparatus may be positioned to position the chamber at a predetermined distance from the support plate surface, the predetermined distance greater than a thickness of the first layer, to determine a height of the region over the first layer. Appropriate positioning and therefore sizing of the region can aid efficient removal of vapour of the first portion of the first fluid, as will now be explained.

The first fluid in examples comprises a first portion comprising the third fluid and a second portion which for examples comprises the first fluid. In other examples the first fluid comprises only the first fluid and is not therefore a mixture with the third fluid. The second portion of the first fluid is for example the first liquid described earlier in the electrowetting element, and is for example a first alkane such as decane. The third fluid is a more volatile fluid than the first fluid, and a constituent molecule of the third fluid has for example a lower relative molecular mass than a constituent molecule of the first fluid. In examples, the third fluid such as a second alkane may have a lower enthalpy of vaporisation than a first alkane of the second portion of the first fluid. The third fluid may for example comprise at least one alkane, for example a second alkane, and may in some examples be a mixture of alkanes, for example of pentane and heptane.

Where the first fluid being dispensed is a mixture, the first fluid comprises appropriate volume proportions of the first portion comprising the third fluid and the second portion of the first fluid, with the first fluid being dispensed where appropriate being a mixture of appropriate volume proportions of the constituent fluids.

Where the first fluid comprises a dye or pigment, in examples the first layer fluid is formulated such that the dye or pigment tends to dissolve in the first fluid and not the third fluid, meaning that with vaporisation of the third fluid the dye or pigment remains with the non-vaporising second portion of the first fluid.

At least one fluid component of the third fluid is more volatile than the first fluid. The volatility of the third fluid is selected, in contrast to the first fluid, so that the third fluid has a tendency to vaporise whereas the first fluid does not, for example at room temperature such as 25 degrees Celsius. In this way, the third fluid has a tendency to vaporise into the region over the first layer of the dispensed fluid.

Such vaporisation may in some examples be aided by applying energy to the first layer of the first fluid, to assist vaporisation of the first portion of the first fluid. For example, such energy may be heat energy to the first layer or in the form of agitating the first layer. However, in other examples, the vaporisation may occur of its own accord, for example by evaporation. Removal of vapour may assist such vaporisation, as described below, by reducing a saturation of the region 56 with vapour, thereby creating a greater capacity in the region for more vapour from the first layer.

Vaporisation is typically where molecules of a fluid, in these examples a liquid, move into a gaseous phase. Such a change from the liquid to the gaseous phase is not caused by boiling, but instead by sufficiently energetic molecules escaping from a surface of the first layer of fluid.

Once the first layer has been dispensed, the first portion of the first fluid tends to vaporise 62 into the region 56. Thus, vapour of the first portion vaporises, for example evaporates, from the first layer into the region. Where the first layer comprises the first fluid and the third fluid, the third fluid tends to vaporise without the second portion of the first fluid vaporising and thus without substantially (e.g. within detectable amounts) removing a vapour of the second portion of the first fluid. Thus the first portion of the first fluid is vaporised from the first layer, with the vapour being a vapour of the third fluid.

In the method of examples the vapour in the region 56 over the first layer is removed. This is done for example using the vapour removal system.

The chamber 58 receives the vapour, with the vapour either moving from the region directly into the chamber 58 where the side of the chamber is open towards the region, or with the vapour moving through the barrier 60 and into the chamber 58. As vapour moves out of the region 56, there is less vapour in the region, which can encourage further vaporisation of the first layer such as of the third fluid.

To remove the vapour from the chamber and/or encourage the vapour to move from the region into the chamber (and therefore encourage further vaporisation of the first fluid into the region), vapour from the chamber is removed. FIG. 3 shows an example with a vapour extraction system 64 which for example has a blower 66 fluidly connected to a gas inlet 68 of the chamber and configured to pass or blow a gas such as air into the chamber through the gas inlet, through the chamber, and out from the chamber through a gas inlet 70. Arrows show this movement of gas in FIG. 3. The removed vapour may for example be collected by a collector 72 which may condense the vapour for collection.

In other examples, the chamber may have only a gas outlet fluidly connected to a suction pump configured to suck the vapour out from the chamber through the gas outlet. In this way an at least partial vacuum may be applied within the chamber which in turn causes the vapour to be sucked into the chamber, thus applying an at least partial vacuum in the region over the first layer.

Thus, with the blower or suction pump, the vapour may be removed from the region and from the chamber. The at least partial vacuum or the passage of gas in the chamber can cause a sucking force to be felt in the underlying region over the first layer, aiding removal of the vapour from the region.

As illustrated in FIG. 3, as the vapour is removed, a thickness of the first layer is decreased from the first thickness T1 to for example a second thickness T2 corresponding with a desired thickness of a layer of the first liquid for the electrowetting element. The second thickness T2 is less than, in other words thinner than, the first thickness T1. With appropriate control of various dispensing parameters, explained below, and an appropriate mixture of the first fluid dispensed as the first layer, the amount of vaporising of the first fluid, such as of the first portion comprising the third fluid, can be controlled to accurately obtain a desired thickness of the first layer. In some examples, with appropriate vaporisation control, 90% or more, for example substantially all or all of the third fluid may have been vaporised from the first layer to leave the first layer comprising predominantly, for example 90% or more, the first fluid such as the first liquid 11 before the second layer of the second fluid is dispensed on the first layer by the second dispenser. Hence, the method comprises for example letting, for a sufficient period of time, the first portion of the first fluid to vaporise as a vapour from the first layer into the region over the first layer, until the second portion of the first fluid remains, the second portion corresponding to a desired first fluid amount for the electrowetting element being manufactured.

By decreasing the first layer thickness in this way, a desired thickness of the first fluid can be obtained, with a wall height being greater than the final thickness of the first layer immediately before dispensing the second layer of the second fluid on the first layer. Such a construction of an electrowetting element may be desired with the high walls used for example as spacers between the first and second support plates, or to reduce overflow of the first fluid from one electrowetting element to an adjacent electrowetting element.

With the decreased thickness of the first layer, the second fluid may then be dispensed by the second dispenser as a second layer of the second fluid on the first layer. Then, as will be appreciated by the skilled person, a sealing element may be applied between the first and second support plates, and the first and second support plates sealed together.

The apparatus may comprise a vapour measuring system, for example as part of the collector 72, which is configured to measure a vapour property value of the vapour removed during a given unit of time (in other words a predetermined period of time) from the region 56. Such a vapour property value may represent a quantity of the third fluid or other fluid of the fluid comprised by the vapour removed during the given unit of time. This may be measured by, for the given unit of time during the removing the vapour, condensing the vapour in the collector and measuring a weight of the condensate using suitable condensing and measuring apparatus. From this weight and knowing the relative molecular mass of the third fluid constituent molecules, a quantity of the third fluid can be calculated which has been removed.

With the controller connected to the vapour measuring system, which is also connected to the mixing fluid system, the fluid mixing system may be controlled based on the measured vapour property value. For example, the fluid mixing system may make a first mixture of the fluid for dispensing by the first dispenser by mixing a first volume of the first fluid such as the first liquid with a second volume of the third fluid. In response to the measured vapour property value, the fluid mixing system may change the proportions of the first and third fluids in the first mixture, by for example making a second mixture by mixing a third volume of the first fluid such as the first liquid and a fourth volume of the third fluid. Thus, a first volume ratio between the first volume and the second volume is different from a second volume ratio between the third volume and the fourth volume. For example, by knowing the volume of the first fluid dispensed by the first dispenser in the given unit of time, and by knowing the volume of first fluid required to obtain the first layer with the second thickness for the electrowetting element, and if the measured vapour property value indicates that in the given unit of time too much third fluid vapour has been removed, the mixture of the first fluid may be changed to increase the volume of the first fluid and decrease the volume of the third fluid, to reduce the quantity of third fluid available for vaporisation and removal, and hence increase the thickness of the first layer of the first fluid. In this way first fluid dispensing can be controlled during dispensing.

It is to be noted that in some examples not all third fluid may be vaporised before the second fluid is dispensed as the second layer. The third fluid may in some examples be miscible with the second fluid, such that upon dispensing the second layer of the second fluid any remaining, non-vaporised, third fluid mixes with the second fluid.

It is further noted that the rate of removing the vapour of the first portion of the first fluid, and therefore the thickness of a first layer on which the second layer is dispensed, may be controlled by at least one of the following: controlling a rate of moving at least one of a first dispenser dispensing the fluid and the support plate surface relative to the other of the at least one of the first dispenser and the support plate surface; controlling a predetermined distance between the chamber of the vapour removal system and the support plate surface; controlling a rate of passing a gas over the region over the first layer; controlling a strength of an at least partial vacuum applied to the region over the first layer; controlling a temperature; controlling a volume ratio between the first fluid and the third fluid, with the third fluid more volatile than the first fluid; controlling a rate of dispensing the fluid from the first dispenser; or controlling a thickness of the first layer dispensed during the dispensing the first layer.

Examples are described above with a chamber located over a region over the first layer. It is to be appreciated that in further examples the vapour removal system envisages any construction or implementation which enables removal of vapour from the region over the first layer. So, the first and second dispensers may be spaced closer to each other than described, with for example a thinner chamber between them for receiving the vapour. In other examples, a tube or conduit may be positioned between the dispensers for removing the vapour from the region for removing the vapour for collection. In some other examples there may be no chamber above the region; the vapour may be removed along the elongate direction (perpendicular the plane of the cross-section of FIG. 3), for example by applying an at least partial vacuum at one end of the elongate region. In other examples the first dispenser may dispense the first layer and then the second dispenser may dispense the second layer before the vapour removal system is used. In such examples therefore, the first portion of the first fluid may be vaporised from the first layer of the first fluid and through the second layer already dispensed.

It is to be understood that any feature described in relation to any one example may be used alone, or in combination with other features described and may also be used in combination with one or more features of any other of the example, or any combination of any other of the examples. Furthermore, equivalents and modifications not described above may also be employed without departing from the scope of the accompanying claims.

What is claimed is:

1. A method of dispensing fluids for manufacturing an electrowetting element, comprising:
   dispensing a first layer of a first fluid on a support plate surface;
   letting a first portion of the first fluid vaporise as a vapour from the first layer into a first region above and over the first layer, until a second portion of the first fluid remains which corresponds to a desired first fluid amount for the electrowetting element;
   removing the vapour from the first region using a vapour removal system comprising a chamber comprising a vapour permeable barrier which separates a second region within the chamber from the first region which is outside the chamber, wherein the second region is above and over the first region, the removing the vapour comprising receiving the vapour into the second region within the chamber from the first region through the vapour permeable barrier; and
   dispensing on the first layer a second layer of a second fluid, the second fluid immiscible with the first fluid,
   wherein the chamber is located between a first dispenser dispensing the first fluid and a second dispenser dispensing the second fluid.

2. The method according to claim 1, the first portion comprising a third fluid more volatile than the second portion, the vapour being a vapour of the third fluid.

3. The method according to claim 2, the removing the vapour comprising removing the vapour of the third fluid without substantially removing a vapour of the second portion of the first fluid.

4. The method according to claim 1, comprising applying energy to the first layer of the first fluid to assist the first portion of the first fluid to vaporise as the vapour from the first layer into the first region.

5. The method according to claim 1, the dispensing the first layer comprising dispensing the first layer of the first fluid on the support plate surface with a first thickness substantially equal to a wall height of at least one support plate wall, and the second portion of the first fluid having a second thickness less than the wall height.

6. The method according to claim 1, wherein the removing the vapour comprises applying an at least partial vacuum to the second region within the chamber.

7. The method according to claim 1, wherein the removing the vapour comprises passing a gas through the second region within the chamber.

8. The method according to claim 1, the first portion of the first fluid comprising a third fluid, the second portion of the first fluid comprising a first alkane and the third fluid comprising a second alkane with a lower relative molecular mass than the first alkane.

9. The method according to claim 1, the first portion of the first fluid comprising a third fluid, the second portion of the first fluid comprising a first alkane and the third fluid comprising a second alkane with a lower enthalpy of vaporisation than the first alkane.

10. The method according to claim 1,
   the dispensing the first layer comprising dispensing a first mixture as the first layer on the support plate surface, the first mixture comprising a first volume of the first fluid mixed with a second volume of a third fluid, the third fluid more volatile than the first fluid,
   the method comprising:
      during the removing the vapour, measuring a vapour property value of the vapour removed during a given unit of time;
      based on the vapour property value, controlling a fluid mixing system to make a second mixture instead of the first mixture by mixing a third volume of the first fluid with a fourth volume of the third fluid, a first volume ratio between the first volume and the second volume different from a second volume ratio between the third volume and the fourth volume; and
      dispensing the second mixture as the first layer on the support plate surface.

11. The method according to claim 1, comprising:
   during the dispensing the first layer, moving one of the first dispenser dispensing the first fluid or the support plate surface relative to the other of the first dispenser or the support plate surface.

12. The method according to claim 1, comprising:
   before the dispensing the first layer, positioning the chamber of the vapour removal system at a predetermined distance from the support plate surface greater than a thickness of the first layer, to determine a height of the first region over the first layer.

13. The method according to claim 1, comprising controlling a rate of the removing the vapour by at least one of:
   controlling a rate of moving one of the first dispenser dispensing the first fluid or the support plate surface relative to the other of the first dispenser or the support plate surface;

controlling a predetermined distance between the chamber of the vapour removal system and the support plate surface;

controlling a rate of passing a gas through the second region within the chamber;

controlling a strength of an at least partial vacuum applied to the second region within the chamber;

controlling a temperature;

controlling a volume ratio between the first fluid and a third fluid in a mixture of the first fluid and the third fluid, the third fluid more volatile than the first fluid;

controlling a rate of dispensing the first fluid from the first dispenser; or controlling a thickness of the first layer dispensed during the dispensing the first layer.

14. The method according to claim 10, the vapour property value representing a quantity of the third fluid in the vapour removed during the given unit of time.

15. The method according to claim 1, the dispensing the first layer comprising dispensing, using the first dispenser, the first layer of the first fluid on the support plate surface with a first thickness, the method comprising controlling the first thickness by at least one of:

controlling a rate of dispensing the first fluid from the first dispenser;

controlling a distance between the first dispenser and the support plate surface; or controlling a speed of moving the first dispenser over the support plate surface.

16. The method according to claim 1, wherein the vapour permeable barrier is a vapour permeable membrane.

17. The method according to claim 2, wherein the third fluid is a mixture of alkanes.

18. The method according to claim 2, wherein the first fluid comprises at least one of a dye or a pigment, the at least one of the dye or the pigment more soluble in the first fluid than in the third fluid.

19. The method according to claim 1, wherein the letting the first portion of the first fluid vaporise comprises letting the first portion of the first fluid vaporise through the second layer of the second fluid after the dispensing on the first layer the second layer of the second fluid.

20. The method according to claim 1, wherein the chamber overlaps the first region.

* * * * *